No. 745,679. PATENTED DEC. 1, 1903.
L. A. SCHULZE.
MOLDER'S SLICK.
APPLICATION FILED JUNE 17, 1903.
NO MODEL.
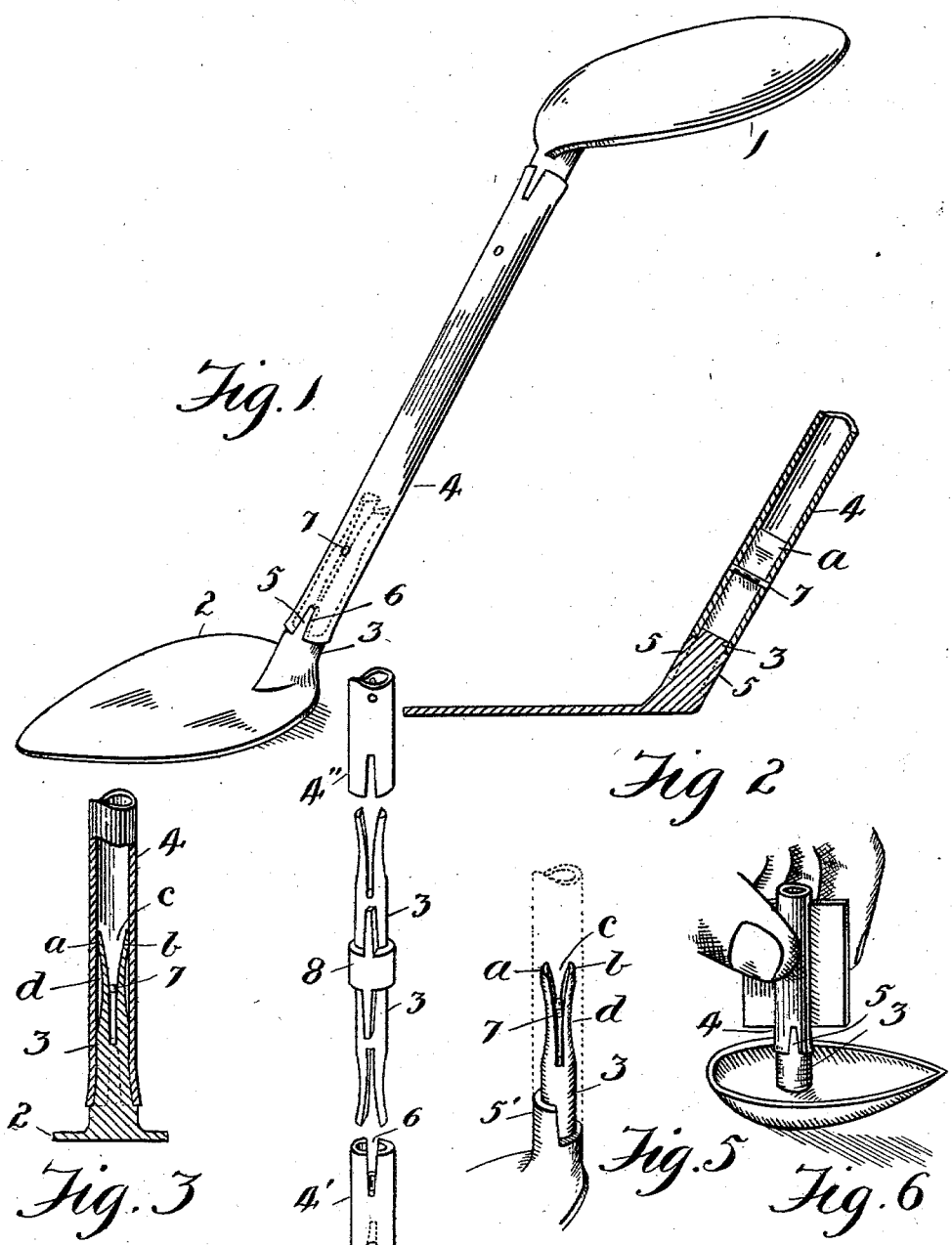

No. 745,679.

Patented December 1, 1903.

UNITED STATES PATENT OFFICE.

LOUIS ALBERT SCHULZE, OF SAN FRANCISCO, CALIFORNIA.

MOLDER'S SLICK.

SPECIFICATION forming part of Letters Patent No. 745,679, dated December 1, 1903.

Application filed June 17, 1903. Serial No. 161,917. (No model.)

*To all whom it may concern:*

Be it known that I, LOUIS ALBERT SCHULZE, a citizen of the United States, residing at 783 Mission street, San Francisco, in the county of San Francisco and State of California, have invented certain new and useful Improvements in Molders' Slicks; and I do hereby declare the following to be a full, clear, and exact description of the invention, such as will enable others skilled in the art to which it appertains to make and use the same.

This invention is an improvement over the devices shown in my application filed July 23, 1902, Serial No. 116,692, and in addition to possessing all the advantageous features of said former application its simplicity and security of construction are brought to a higher degree of perfection.

As in my former invention, various sizes and forms of tools can be attached to the handle, or the latter can be adjusted in length to suit any particular purpose. The handles are made double-ended to accommodate tools at both ends or permit of several lengths of handles being connected together.

I have constructed the handle and connecting means free from any surface irregularity and in that way lessen the liability of injuring the mold as the molder is slicking it.

The device is clearly illustrated in the accompanying drawings, in which—

Figure 1 is a perspective view of a "heart-slick" and a "spoon-slick" connected together by means of my detachable handle. Fig. 2 is a section showing the manner of connecting the handle with the tool. Fig. 3 is a section taken at right angles to that shown in Fig. 2. Fig. 4 is a perspective view of several joints of handle and the coupling employed to unite them. Fig. 5 is a perspective view of the tool-shank, the relative position of the handle being shown by means of dotted lines. Fig. 6 is a perspective view of an "egg-slick," showing the ordinary handle removed and a webbed handle set in place for shallow molds.

Referring now to the above views by reference characters, 1 and 2 are ordinarily-formed heart and spoon slicks, respectively. Extending outward at an angle with the body of the slick is the integrally-formed stem 3, which is adapted to enter the tubular handle 4. This stem 3 is formed at its outer end with two legs *a* and *b*, which gradually diverge, leaving an interposed tapered slot *c*. At the base of this stem 3 are the diametrically opposite tapered lugs 5, while corresponding with these lugs and adapted to receive them are the slots 6, cut in the extremities of the handle. Just above the slots 6 and passing transversely through the tubular handle are the pins 7.

Now it will be readily seen that as the stem 3 is forced into the open end of the tubular handle 4 the legs *a* and *b* will straddle pin 7, and as the stem is forced farther home the relatively narrow portion of the slot *c* will bind on the pin and hold it fast. To permit of a slight spring of the legs *a* and *b*, I have cut away the outer surfaces, as shown at *d*. Simultaneous with the above operation the lugs 5 will enter slots 6 and tend to spread the opposite walls thereof, thereby adding further security against accidental disengaging of the slick from the handles.

In preparing deep and complicated molds the molder often has occasion to employ a comparatively long handle, and in order to fulfil this requirement I have provided the coupling 8, (shown in Fig. 4,) which is formed with double-ended stems 3, which unite extra lengths of handles 4' and 4". These stems and handles and manner of connecting same are identical with the slick stems and handles above described.

This invention is of great importance to foundry-molders, for by its use a larger variety of tools will constitute the molder's kit, as the expense of purchasing a handle for each tool can be diverted to accumulate additional tools.

The practical value of the invention has been completely demonstrated by the inventor, who has had forty years' experience as a skilled molder.

In Fig. 5 the lug 5' takes the place of lugs 5, and in that case the end of the handle is cut away correspondingly.

What I claim, and desire to secure by Letters Patent, is—

1. A molder's tool formed with a projecting stem, a handle adapted to be removably connected to said stem and a spreading yielding fork on said stem, said handle being provided with a transverse pin to engage said fork and force the legs thereof apart for the purpose set forth.

2. A molder's tool formed with a projecting stem, having a yielding forked end, a handle adapted to engage said stem and held thereon by means of said yielding forks, said handle being composed of a plurality of sections held together by means of a suitable removable coupling for the purpose set forth.

In testimony whereof I affix my signature in presence of two witnesses.

LOUIS ALBERT SCHULZE.

Witnesses:
GEORGE PATTISON,
ORPHA C. POOR.